(12) United States Patent
Faruque et al.

(10) Patent No.: US 11,912,230 B2
(45) Date of Patent: Feb. 27, 2024

(54) VEHICLE AIRBAG SYSTEM

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/814,588

(22) Filed: Jul. 25, 2022

(65) Prior Publication Data

US 2024/0025370 A1 Jan. 25, 2024

(51) Int. Cl.
*B60R 21/2338* (2011.01)
*B60R 21/207* (2006.01)

(52) U.S. Cl.
CPC ........ *B60R 21/2338* (2013.01); *B60R 21/207* (2013.01); *B60R 2021/23386* (2013.01)

(58) Field of Classification Search
CPC .............. B60R 21/2338; B60R 21/207; B60R 2021/23386
See application file for complete search history.

(56) References Cited

U.S. PATENT DOCUMENTS

| | | | |
|---|---|---|---|
| 10,336,283 B2 * | 7/2019 | Rickenbach | B60R 21/233 |
| 10,336,284 B2 * | 7/2019 | Dry | B60R 21/23138 |
| 10,518,733 B2 * | 12/2019 | Dry | B60R 21/01554 |
| 10,632,958 B2 * | 4/2020 | Dry | B60R 21/2338 |
| 10,710,539 B2 | 7/2020 | Cho et al. | |
| 10,946,826 B2 * | 3/2021 | Jaradi | B60R 21/264 |
| 11,052,861 B2 * | 7/2021 | Park | B60R 21/233 |
| 11,084,447 B2 * | 8/2021 | Rupp | B60R 21/231 |
| 11,124,147 B2 | 9/2021 | Line et al. | |
| 11,186,245 B2 | 11/2021 | Kadam et al. | |
| 11,208,070 B1 * | 12/2021 | Jaradi | B60R 21/207 |
| 11,285,902 B2 * | 3/2022 | Choi | B60R 21/207 |
| 11,285,904 B2 * | 3/2022 | Jung | B60R 21/2338 |
| 11,312,325 B2 * | 4/2022 | Farooq | B60R 21/264 |
| 11,383,667 B1 * | 7/2022 | Kadam | B60R 21/207 |
| 2021/0339697 A1 * | 11/2021 | Nagasawa | B60R 21/207 |

FOREIGN PATENT DOCUMENTS

WO 2022001536 A1 1/2022

* cited by examiner

*Primary Examiner* — Jason D Shanske
*Assistant Examiner* — Joselynn Y Sliteris
(74) *Attorney, Agent, or Firm* — Frank A. MacKenzie; Bejin Bieneman PLC

(57) ABSTRACT

An assembly includes a seat having a seat bottom that includes a top surface. The assembly includes an airbag supported by the seat and inflatable to an inflated position. The airbag in the inflated position includes a bottom end positioned below the top surface. The assembly includes a pyrotechnic retractor supported by the seat bottom. The assembly includes a tether connected to the bottom end of the airbag and to the pyrotechnic retractor such that actuation of the pyrotechnic retractor retracts the tether and urges the bottom end of the airbag toward the seat bottom.

18 Claims, 6 Drawing Sheets

VEHICLE AIRBAG SYSTEM

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

Figure 1:
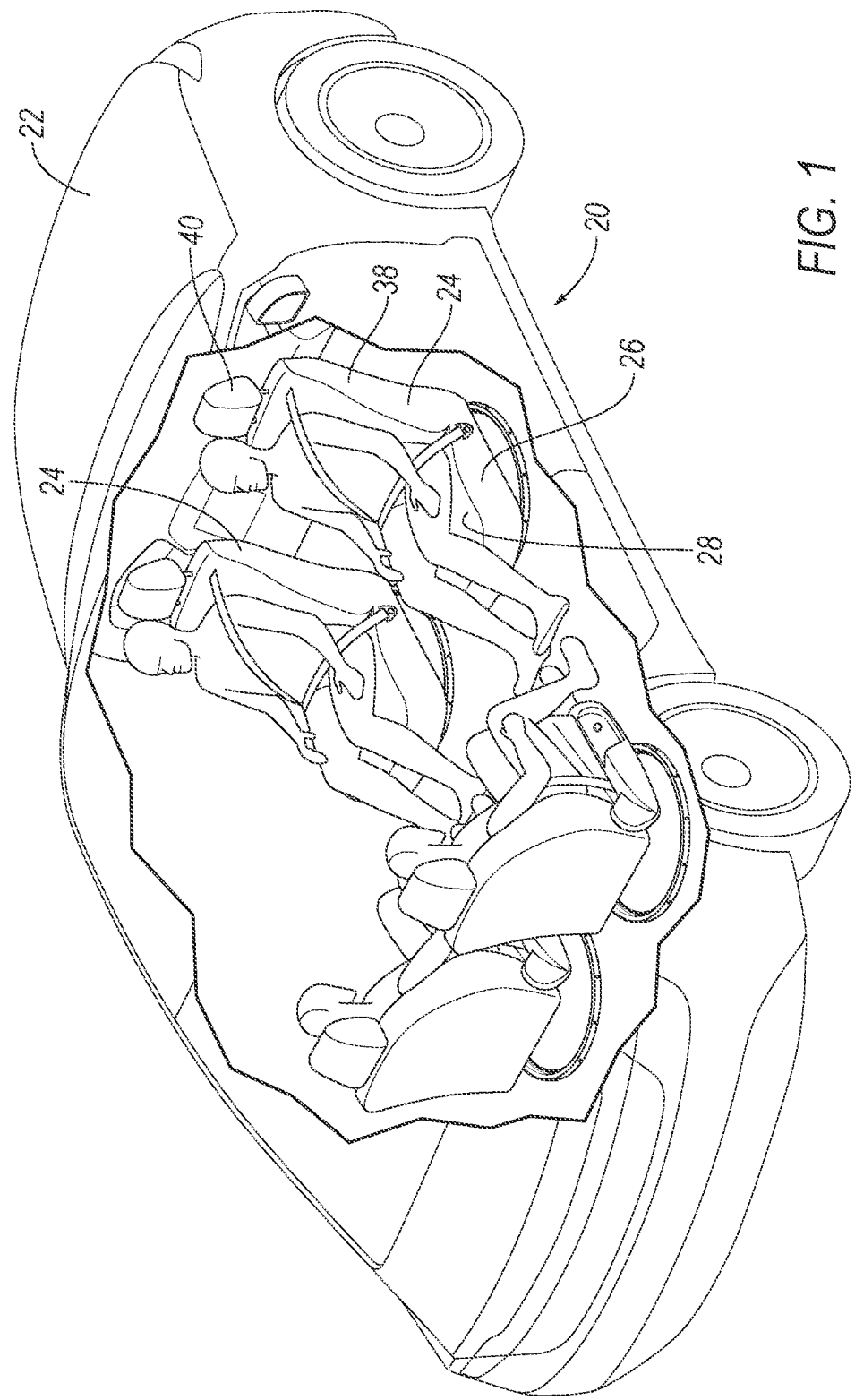
FIG. 1 is a perspective view of a vehicle having seats.

An assembly includes a seat having a seat bottom that includes a top surface. The assembly includes an airbag supported by the seat and inflatable to an inflated position, the airbag in the inflated position including a bottom end positioned below the top surface. The assembly includes a pyrotechnic retractor supported by the seat bottom. The assembly includes a tether connected to the bottom end of the airbag and to the pyrotechnic retractor such that actuation of the pyrotechnic retractor retracts the tether and urges the bottom end of the airbag toward the seat bottom.

The assembly may include a webbing elongated along the bottom end of the airbag, the tether fixed to the webbing.

The assembly may include a webbing retractor supported by the seat, the webbing extending from the webbing retractor.

The seat may include a seatback, the webbing retractor supported by the seatback.

The seatback may include a frame, the webbing retractor fixed to the seatback.

The webbing retractor may be supported by the seat at a right side and further comprising a second retractor supported by the seat at a left side, the webbing extending from the second retractor.

The webbing may be fixed to the airbag.

The webbing may be fixed to the airbag between the tether and the webbing retractor.

The seat bottom may include a frame, the pyrotechnic retractor fixed to the frame.

The pyrotechnic retractor may be supported at a front end of the seat bottom.

The pyrotechnic retractor may be supported at a right side of the seat bottom and the assembly may include a second pyrotechnic retractor supported at a left side of the seat bottom and a second tether connected to the bottom end of the airbag and to the second pyrotechnic retractor.

The seat may include a seatback, the airbag supported by the seatback.

The airbag in the inflated position may extend upward from the seatback and forward of the seat bottom.

The airbag in the inflated position may extend from a right side and a left side of the seatback.

The airbag in the inflated position may surround an occupant cavity.

The seat may include a head restraint supported by the seat back, the head restraint disposed with in the occupant cavity surrounded by the airbag in the inflated position.

The airbag in the inflated position may include a first chamber and a second chamber.

The first chamber may be at a right side of the seat and the second chamber may be at a left side of the seat.

The assembly may include a computer having a processor and a memory storing instructions executable by the processor to actuate the pyrotechnic retractor a specified amount of time after actuating inflation of the airbag.

With reference to the Figures, wherein like numerals indicate like parts throughout the several views, an assembly 20 for controlling kinematics of an occupant of a vehicle 22 is shown. The assembly 20 includes a seat 24 having a seat bottom 26 that includes a top surface 28. The assembly 20 includes an airbag 30 supported by the seat 24 and inflatable to an inflated position. The airbag 30 in the inflated position includes a bottom end 32 positioned below the top surface 28 of the seat bottom 26. The assembly 20 includes a pyrotechnic retractor 34 supported by the seat bottom 26. The assembly 20 includes a tether 36 connected to the bottom end 32 of the airbag 30 and to the pyrotechnic retractor 34.

In the event of certain impacts to the vehicle 22, the airbag 30 may be inflated to the inflated position to surround an occupant of the seat 24. The airbag 30 in the inflated position may control kinematics of the occupant in the seat 24. During inflation, the airbag 30 may travel over a head and shoulders of the occupant as the airbag 30 moves toward the inflated position. After the airbag 30 has moved downward over the shoulders of the occupant to below the top surface 28 of the seat bottom 26, the pyrotechnic retractor 34 may be actuated to retract the tether 36 and urge the bottom end 32 of the airbag 30 toward the seat bottom 26, e.g., drawing the airbag 30 closer to the occupant and controlling kinematics of legs of the occupant.

With reference to FIG. 1, the vehicle 22 may be any suitable type of automobile, e.g., a passenger or commercial automobile such as a sedan, a coupe, a truck, a sport utility, a crossover, a van, a minivan, a taxi, a bus, etc. The vehicle 22, for example, may be autonomous. In other words, the vehicle 22 may be autonomously operated such that the vehicle 22 may be driven without constant attention from a driver, i.e., the vehicle 22 may be self-driving without human input.

The vehicle 22 includes a body (not numbered) including rockers, roof rails, pillars, body panels, vehicle roof, etc. The vehicle 22 includes a passenger compartment (not numbered) to house occupants, if any, of the vehicle 22. The passenger compartment may extend across the vehicle 22, i.e., from one side to the other side of the vehicle 22. The passenger compartment includes a front end and a rear end with the front end being in front of the rear end during forward movement of the vehicle 22.

With continued reference to FIG. 1, the vehicle 22 may include one or more seats 24. Specifically, the vehicle 22 may include any suitable number of seats 24. The seats 24 are supported by a vehicle floor (not numbered). The seats 24 may be arranged in any suitable arrangement in the passenger compartment. As in the example shown in the Figures, one or more of the seats 24 may be at the front end of the passenger compartment, e.g., a driver seat and/or a passenger seat. In other examples, one or more of the seats 24 may be behind the front end of the passenger compartment, e.g., at the rear end of the passenger compartment. The seats 24 may be movable relative to the vehicle 22 floor to various positions, e.g., movable fore-and-aft and/or cross-vehicle. The seat 24 may be of any suitable type, e.g., a bucket seat.

Each seat 24 may include a seatback 38, the seat bottom 26, and a head restraint 40. An occupant of the seat 24 may sit upon the top surface 28 of the seat 24 with their back against the seatback 38. The head restraint 40 may be supported by and extend upwardly from the seatback 38. The head restraint 40 may be stationary or movable relative to the seatback 38. The seatback 38 may be supported by the seat bottom 26 and may be stationary or movable relative to the seat bottom 26. The seatback 38 may extend from an upper end (not numbered) to a lower end (not numbered). The lower end may be connected to the seat bottom 26. The upper end of the seatback 38 may be spaced upwardly from the lower end of the seatback 38, i.e., upwardly from the top surface 28 of the seat bottom 26. The seatback 38, the seat bottom 26, and the head restraint 40 may be adjustable in multiple degrees of freedom. Specifically, the seatback 38, the seat bottom 26, and the head restraint 40 may themselves be adjustable. In other words, adjustable components within the seatback 38, the seat bottom 26, and the head restraint 40 may be adjustable relative to each other.

Figure 2:
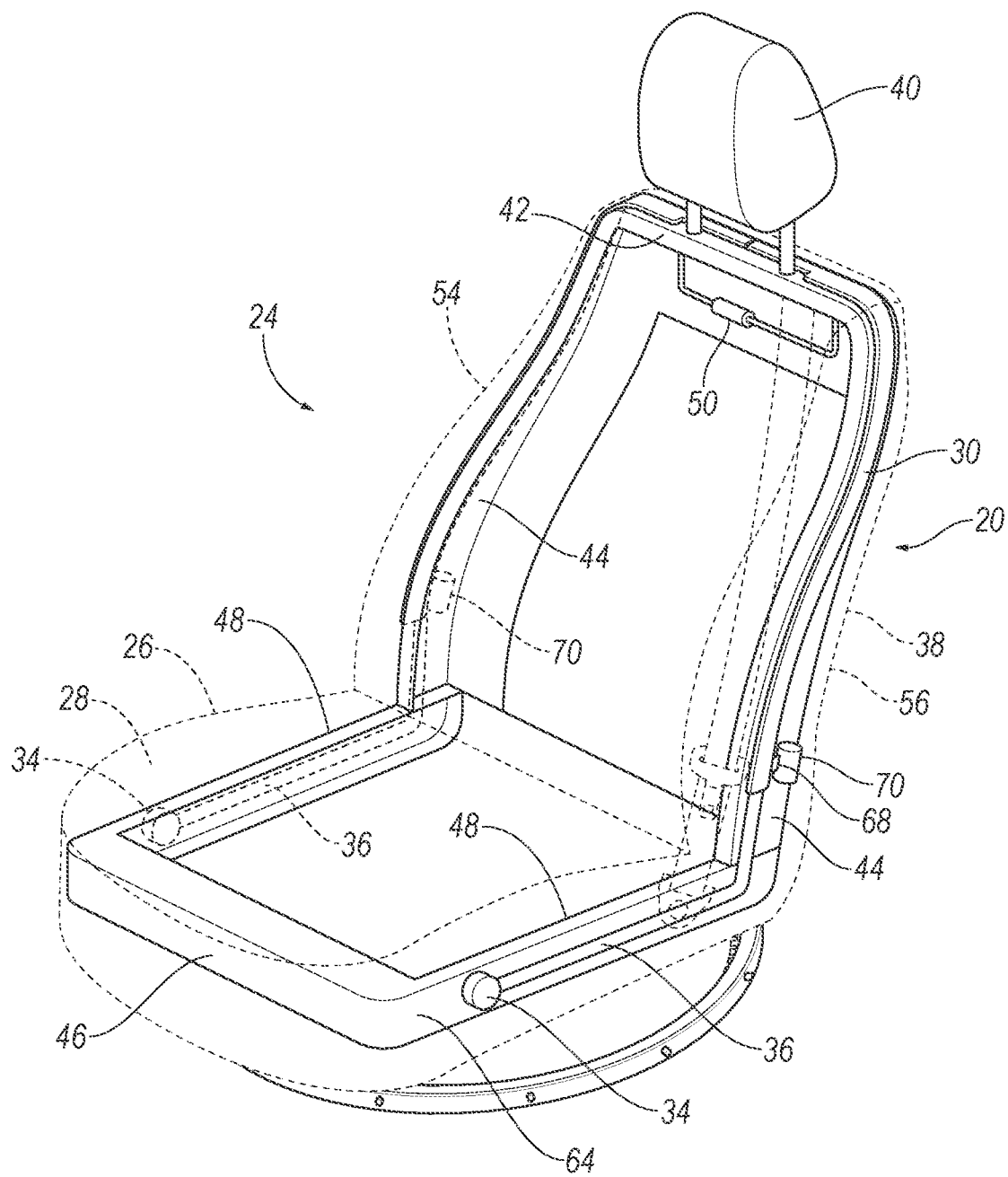
FIG. 2 is a perspective view of one of the seats having an airbag supported by a seatback of the seat.

With reference to FIG. 2, the seatback 38 includes a frame 42 and a covering (not numbered) supported on the frame 42. The frame 42 may include tubes, beams, etc. Specifically, the frame 42 may include a pair of upright frame members 44. The upright frame members 44 are elongated, and specifically, are elongated in a generally upright direction when the seatback 38 is in a generally upright position. The upright frame members 44 are spaced from each other and the frame 42 includes one or move cross-members (not numbered) extending between the upright frame members 44. The frame 42, including the upright frame members 44, may be of any suitable plastic material, e.g., carbon fiber reinforced plastic (CFRP), glass fiber-reinforced semi-finished thermoplastic composite (organosheet), etc. As another example, some or all components of the frame 42 may be formed of a suitable metal, e.g., steel, aluminum, etc. The covering may include upholstery, padding, and/or plastic portions. The upholstery may be cloth, leather, faux leather, or any other suitable material. The upholstery may be stitched in panels around the frame 42. The padding may be between the covering and the frame 42 and may be foam or any other suitable material.

The seat bottom 26 can include a frame 46. The frame 46 may include tubes, beams, etc. Specifically, the frame 46 may include a pair of frame members 48 elongated in a seat-forward direction, e.g., between the seatback 38 and a front of the seat bottom 26. The frame members 48 are spaced from each other along a cross-seat axis. The frame 42 may include cross-members (not numbered) extending between the frame members 48. The cross-member may be elongated along the cross-seat axis. The frame 46 can include a seat pan (not shown). The seat pan may be generally planar and extend from one of the frame members 48 to the other of the frame members 48, e.g., along the cross-seat axis. The seat pan may be fixed to the frame members 48. The frame 46, including the frame members 48, the cross-members, and the seat pan may be of any suitable plastic material, e.g., carbon fiber reinforced plastic (CFRP), glass fiber-reinforced semi-finished thermoplastic composite (organosheet), etc. As another example, some or all components of the frame 46 may be formed of a suitable metal, e.g., steel, aluminum, etc. The seat bottom 26 can include a covering (not numbered). The covering may include upholstery and padding. The upholstery may be cloth, leather, faux leather, or any other suitable material. The upholstery may be stitched in panels around the frame 46. The padding may be between the upholstery and the frame 46. The padding may be foam or any other suitable material.

The seat bottom 26 includes the top surface 28. The top surface 28 may be an outer surface of the covering and facing upward. The top surface 28 may be a class-A surface, i.e., a finished surface exposed to view by a customer and free of unaesthetic blemishes and defects. The occupant of the seat 24 may sit upon the top surface 28.

Each seat 24 may rotate about a vertical axis (not numbered) that extends through the vehicle roof and the vehicle floor. For example, the seats 24 may rotate between a forward-facing position and a rearward-facing position. In the forward-facing position, an occupant of the seat 24 faces the front end of the passenger compartment. In the rearward-facing position, an occupant of the seat 24 faces the rear end of the passenger compartment. The seats 24 may rotate completely, i.e., 360°, about the vertical axis. The seats 24 may rotate between fixed positions, e.g., the forward-facing position and the rearward-facing position, or may be rotatable to an infinite number of positions.

Figure 3:
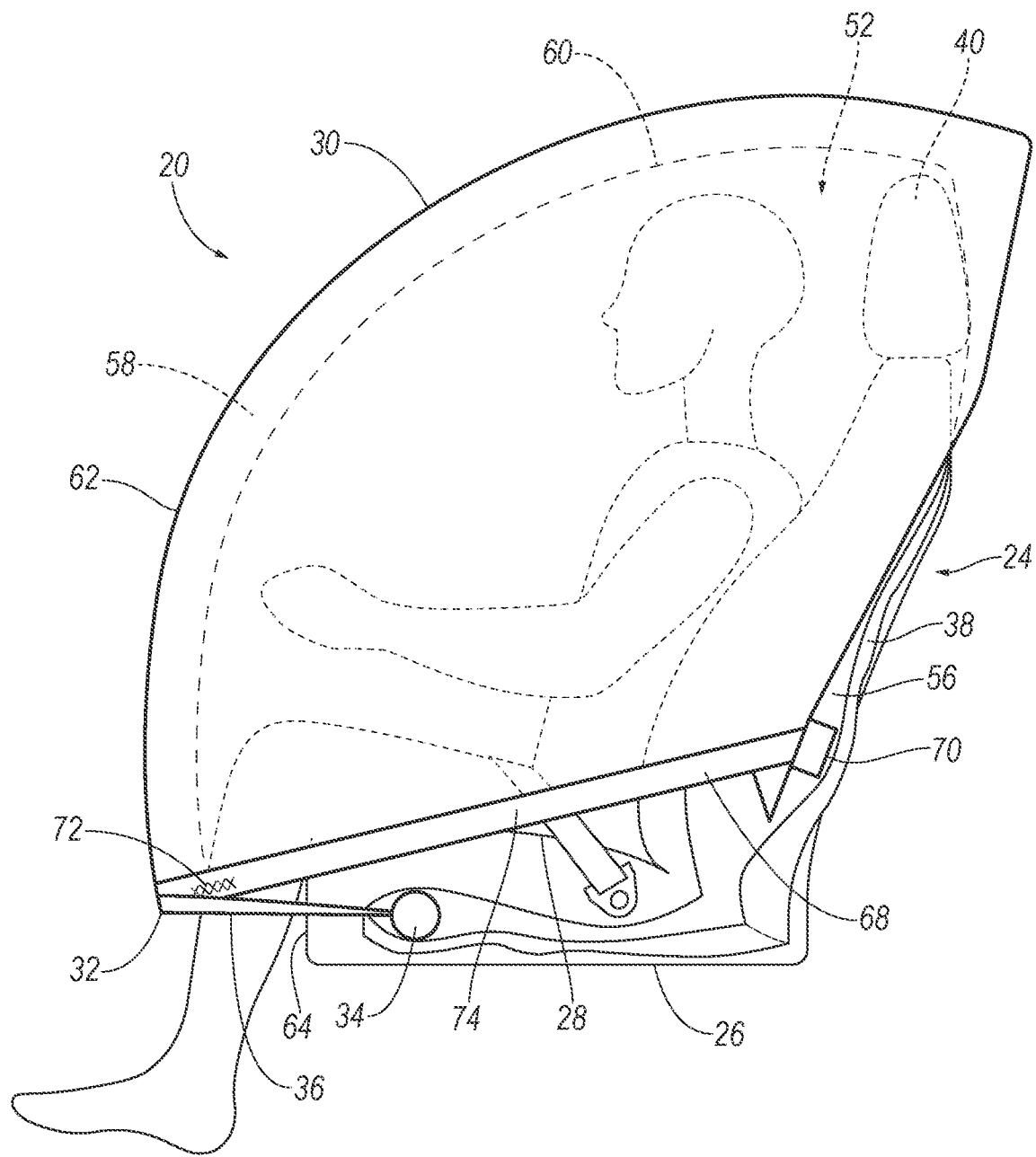
FIG. 3 is a side view of the seat with the airbag in an inflated position.
Figure 4:
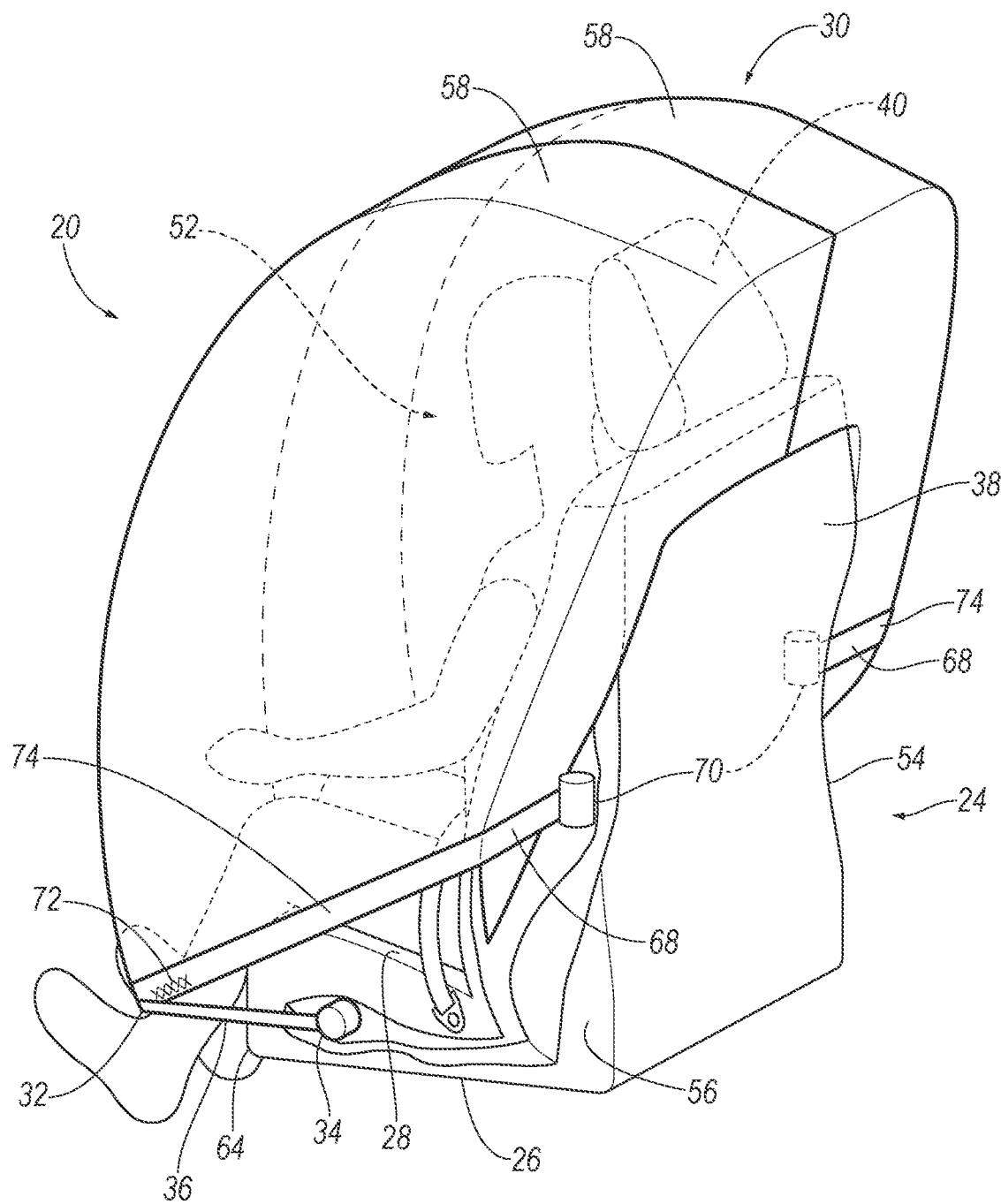
FIG. 4 a perspective rear-side view of the seat with a two-chamber airbag in an inflated position.

With reference to FIGS. 2-4, one or more of the seats 24 may include an airbag assembly. The airbag assembly includes the airbag 30, an inflator 50, and may include a housing (not shown). The airbag assembly may be supported by the seatback 38. Specifically, the airbag 30 is supported by the seatback 38, e.g., by the frame 42 of the seatback 38 at an upper end of the seatback 38. In an example in which the airbag 30 assembly 20 includes the housing, the housing may be fixed directly to the seat 24, e.g., to the frame 42 of the seatback 38. The airbag assembly may be fixed to the upper end of the frame 42 of the seatback 38. The airbag assembly may be concealed by the covering, e.g., the upholstery of the seat 24. In other words, the airbag assembly may be between the frame 42 of the seatback 38 and the upholstery of the seatback 38. The covering may be releasable along the airbag 30, e.g., the covering may include a tear seam that is releasable as the airbag 30 moves from an uninflated position to the inflated position.

As shown in FIG. 2, the airbag 30 in the uninflated position may extend along the frame 42 of the seatback 38. Specifically, the airbag 30 in the uninflated position may extend along the upright frame members 44 and across an upper cross-member of the frame 42 of the seatback 38.

As shown in FIGS. 3 and 4, the airbag in the inflated position is positioned to control kinematics of an occupant of the seat 24 supporting the airbag 30, e.g., including controlling kinematics of legs of the occupant. The airbag 30 in the inflated position may surround an occupant cavity 52, e.g., with the airbag 30 in the inflated position extending along a top, a front, and sides of the occupant cavity 52, and with the seatback 38 of the seat 24 extending along a back of the occupant cavity 52. The head restraint 40 may be disposed within the occupant cavity 52 surrounded by the airbag 30 in the inflated position. For example, the airbag 30 may extend upward from the seatback 38 away from the seat bottom 26 and behind the head restraint 40 and may extend forward relative to the seat 24 over the head restraint 40. The airbag 30 in the inflated position may extend from a right side 54 and a left side 56 of the seatback 38, e.g., in a seat forward direction and enclosing the sides of the occupant cavity 52. The airbag 30 extends, e.g., from the seat back, to forward of the seat bottom 26.

The airbag 30 in the inflated position includes the bottom end 32. Kinematics of legs of the occupant may be controlled by the bottom end 32. For example, the legs of the occupant may be between the bottom end 32 of the airbag 30 and the seat bottom 26 of the seat 24 supporting the airbag 30. The bottom end 32 of the airbag 30 in the inflated position extends laterally, i.e., along the cross-seat axis, in front of the seat bottom 26, e.g., with a gap between a front of the seat bottom 26 and the bottom end 32 of the airbag 30. The bottom end 32 may extend longitudinally, i.e., parallel to the seat-forward direction, from in front of the seat 24 in a seat rearward-direction toward the seatback 38. The bottom end 32 of the airbag 30 is positioned below the top surface 28 of the seat bottom 26. For example, the top surface 28 may be between the bottom end 32 of the airbag 30 and the head restraint 40 along the vertical axis.

The airbag 30 may include one or more inflation chambers 58, e.g., enclosed between respective inner panels 60 and outer panels 62. Inflation of the chamber(s) 58 moves the airbag 30 to the inflated position. For example, the airbag 30 may include a single inflation chamber 58, as shown in FIG. 3. As another example, the airbag 30 may include first and second chambers 58, as shown in FIG. 4. The first chamber may be at the right side 54 of the seat 24 and the second chamber may be at the left side 56 of the seat 24. Both the first and second inflation chambers 58 may inflate to the inflated position simultaneously, i.e., at the same time. The first chamber and the second chambers 58 may be releasably fixed to each other, e.g., via clips, Velcro®, etc. The airbag 30 may include any number or shape of chambers 58.

The inflator 50 may be supported by the frame 42 of the seatback 38. The inflator 50 is fluidly connected to the airbag 30, e.g., to the inflation chamber(s) 58. The inflator 50 inflates the airbag 30 with inflation medium, such as a gas, to move the airbag 30 from the uninflated position to the inflated position. In other examples, the airbag assembly may include a second inflator (not shown). In such an example, the inflator 50 may be fluidly connected to one inflation chamber 58 and the second inflator may be fluidly connected to the other inflation chamber 58. The airbag 30 assembly 20 may include any suitable number of inflators 50 to inflate the airbag 30. The inflator 50 may be, for example, a pyrotechnic inflator that ignites a chemical reaction to generate the inflation medium, a stored gas inflator that releases (e.g., by a pyrotechnic valve) stored gas as the inflation medium, or a hybrid.

With reference to FIGS. 2-5, the assembly 20 includes one or more pyrotechnic retractors 34 supported by the seat bottom 26. For example, the assembly 20 may include a pair of pyrotechnic retractors 34 spaced from each other by the seat bottom 26, i.e., one pyrotechnic retractor 34 supported at the right side 54 of the seat bottom 26 and another pyrotechnic retractor 34 supported at the left side 56 of the seat bottom 26. The pyrotechnic retractors 34 may be supported at a front end 64 of the seat bottom 26, i.e., closer to a front edge of the seat 24 than a to a rear edge of the seat 24. The pyrotechnic retractors 34 may be fixed to the frame 42 of the seat bottom 26, e.g., to the frame members 48 via fasteners, weld, or any suitable structure.

Each pyrotechnic retractor 34 is actuatable to retract the tether 36 connected thereto, e.g., in response to a command received from a computer 66. The pyrotechnic retractor 34 includes a pyrotechnic charge that is activated to actuate the pyrotechnic retractor 34. The pyrotechnic retractor 34 may be, for example, a rotary actuator or a linear actuator. In examples where the pyrotechnic retractors 34 are rotary, the pyrotechnic charge rotates a shaft connected to the tether 36 such that the tether 36 winds around the shaft. In other examples, the pyrotechnic retractor 34 may be a piston linkage, in which the pyrotechnic charge for example, drives a piston attached to the tether 36; a ball-in-tube linkage, in which a pyrotechnic charge propels a ball or balls over a cogwheel connected to the tether 36; or any other suitable type.

The tethers 36 in a packaged state (prior to inflation of the airbag 30) may be routed along the frame members 48 and then along the upright frame members 44 up to the airbag 30, as shown in FIG. 2. Guides or breakable push pins (not shown) may be used to place the tether 36 in the route in the package state The tethers 36 are connected to the bottom end 32 of the airbag 30. For example, the tethers 36 may be fixed to a webbing 68 that extends along the bottom end 32 of the airbag 30. One tether 36 may be fixed to the webbing 68 at the right side 54. The other tether 36 may be fixed to the webbing 68 at the left side 56. The tethers 36 are connected to the respective pyrotechnic retractor 34, e.g., one tether 36 connected to the pyrotechnic retractor 34 at the right side 54 and one to the pyrotechnic retractor 34 at the left side 56. Retraction of the tethers 36 from actuation of the pyrotechnic retractors 34 urges the webbing 68 and the bottom end 32 of the airbag 30 toward the front end 64 of the seatback 38.

The webbing 68 controls the trajectory of the airbag 30 and kinematics of the occupant. The webbing 68 is elongated along the bottom end 32 of the airbag 30, e.g., extending from the webbing retractor 70 at one side of the seatback 38 along the along the bottom end 32 of the airbag 30 to the webbing retractor 70 at the other side of the seatback 38. The webbing 68 may be a fabric, e.g., woven nylon. The webbing 68 may extend along the inner panel 60 or the outer panel 62.

The webbing 68 is fixed to the airbag 30, e.g., to the inner panel 60 or the outer panel 62. The webbing 68 may be fixed via stitching 72, adhesive, friction weld, etc. The webbing 68 may be fixed to the airbag 30 between the tether 36 and the webbing retractor 70, e.g., leaving a portion 74 of the webbing 68 not fixed to the airbag 30. The portion 74 of the webbing 68 not fixed to the airbag 30 may be retracted by, and paid out from, the respective webbing retractor 70. The webbing 68 may include portions 74 not fixed to the webbing 68 the right side 54 and the left side 56 of the seatback 38.

The assembly 20 may include one or more webbing retractors 70 supported by the seatback 38 of the seat 24. For example, one webbing retractor 70 may be supported by the seat 24 at the right side 54 and another webbing retractor 70 may be supported by the seat 24 at the left side 56. The webbing 68 may extend from both of the webbing retractors 70. The webbing retractors 70 provide tension to the webbing 68 and may pay-out and take-up the webbing 68. The webbing retractors 70 may be fixed to the seatback 38, e.g., to the upright frame members 44. The webbing retractors 70 may be concealed under the cover of the seatback 38.

The webbing retractors 70 may each include a spool (not shown), the webbing 68 wound around the spool. The spools are rotatable to allow the webbing 68 to pay-out or take-up. The webbing retractors 70 may each include a housing (not numbered) and a spring (not shown) between the spool and the housing to provide torque to the spool. As the spool rotates within the housing, the spring may bias the spool toward a direction opposite of the rotation of the spool.

Figure 5:
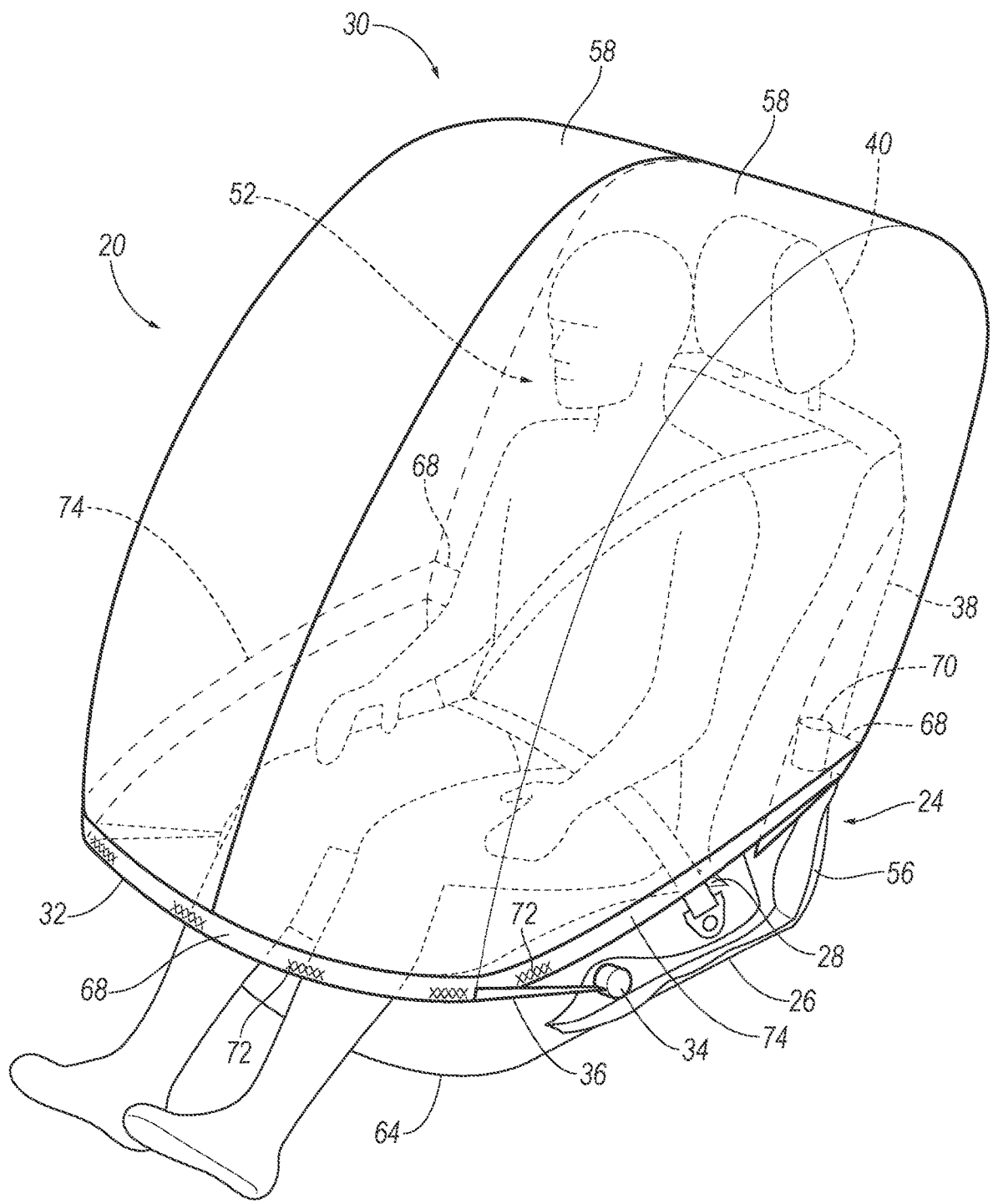
FIG. 5 a perspective front-side view of the seat with the two-chamber airbag in an inflated position.
Figure 6:
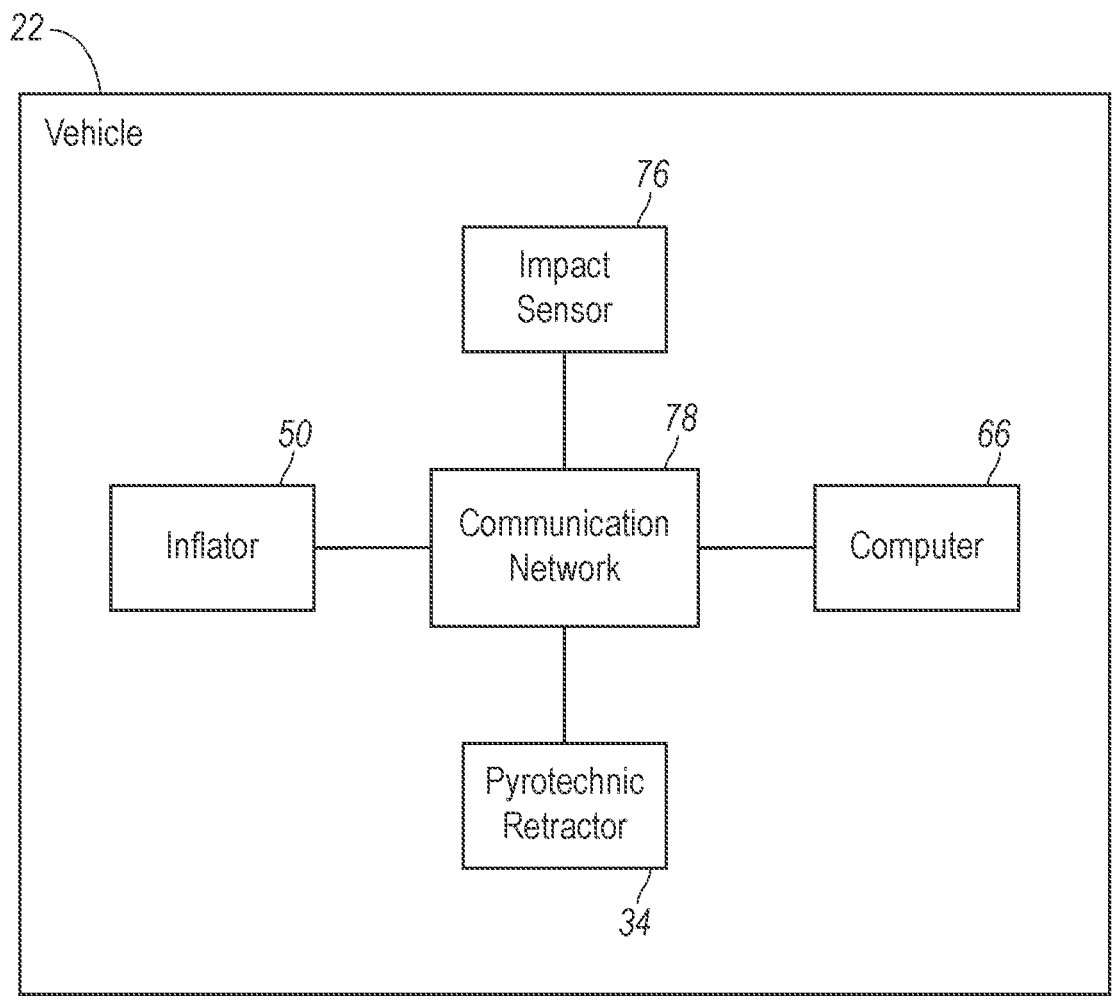
FIG. 6 is a block diagram of components of the vehicle.

With reference to FIG. 5, the vehicle 22 can include an impact sensor 76 that is configured to detect certain impacts to the vehicle 22. The impact sensor 76 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 76 may be located at numerous points in or on the vehicle 22.

The computer 66 includes a processor and a memory. The memory includes one or more forms of computer readable media, and stores instructions executable by the processor for performing various operations, processes, and methods, as disclosed herein. For example, the computer 66 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 66 may be a restraints control module. In another example, computer 66 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 66. The memory can be of any type, e.g., hard disk drives, solid state drives, servers, or any volatile or non-volatile media. The memory can store the collected data sent from the sensors.

The computer 66 is generally arranged for communications on a communication network 78 that can include a bus in the vehicle 22 such as a controller area network (CAN) or the like, and/or other wired and/or wireless mechanisms. Via the communication network 78, the computer 66 may transmit messages to various devices in the vehicle 22, and/or receive messages (e.g., CAN messages) from the various devices, e.g., the pyrotechnic retractors 34, the inflator 50, the computer 66, the impact sensor 76, etc. Alternatively or additionally, in cases where the computer 66 comprises a plurality of devices, the communication network 78 may be used for communications between devices represented as the computer 66 in this disclosure.

The computer 66 is programmed to, i.e., the memory stores instructions executable by the processor to, actuate the pyrotechnic retractor 34 a specified amount of time after actuating inflation of the airbag 30. The specified amount of time is sufficient to permit movement of the bottom end 32 of the airbag 30 over the head restraint 40 and down to below the top surface 28, e.g., such that actuation of the pyrotechnic retractor 34 draws the bottom end 32 of the airbag 30 rearward toward the seat bottom 26 after the bottom end 32 is below the top surface 28 of the seat bottom 26. The specified amount of time may be determined through empirical testing or simulation indicating an amount of time necessary for the airbag 30 to move to the inflated position once the inflator 50 is activated. The specified amount of time may be pre-stored in the memory of the computer 66, e.g., upon manufacture. The specified amount of time may be, for example, between 30 and 50 milliseconds.

For example, the computer 66 may first transmission a command, such an electric pulse, to the inflator 50 in response to receiving information from the impact sensor 76 indicating certain impacts and/or a preimpact to the vehicle 22. After triggering the inflator 50, the computer 66 waits the specified amount of time, and then transmits a command to the pyrotechnic retractor 34 instructing actuation and retraction of the tether 36. Retraction of the tether 36 may draw the bottom end 32 of the airbag 30 toward the seat bottom 26 to control kinematics of the legs of the occupant therebetween.

In the drawings, the same reference numbers indicate the same elements. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

The adjectives "first" and "second" are used throughout this document as identifiers and do not signify importance, order, or quantity.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a seat having a seat bottom that includes a top surface and a front end;
an airbag supported by the seat and inflatable to an inflated position, the airbag in the inflated position including a bottom end positioned below the top surface;
a pyrotechnic retractor supported by the seat bottom;
a tether connected to the bottom end of the airbag seat-forward of the front end of the seat bottom and below the top surface and connected to the pyrotechnic retractor, the tether extending from the bottom end seat-rearward to the pyrotechnic retractor at the seat bottom such that actuation of the pyrotechnic retractor retracts the tether and urges the bottom end of the airbag toward the seat bottom; and
a computer having a processor and a memory storing instructions executable by the processor to actuate the pyrotechnic retractor a specified amount of time after actuating inflation of the airbag, the specified amount of time sufficient to permit movement of the bottom end of the airbag down to below the top surface, and the specified amount of time is 30 to 50 milliseconds.

2. The assembly of claim 1, further comprising a webbing elongated along the bottom end of the airbag, the tether fixed to the webbing.

3. The assembly of claim 2, further comprising a webbing retractor supported by the seat, the webbing extending from the webbing retractor.

4. The assembly of claim 3, wherein the seat includes a seatback, the webbing retractor supported by the seatback.

5. The assembly of claim 4, wherein the seatback includes a frame, the webbing retractor fixed to the seatback.

6. The assembly of claim 3, wherein the webbing retractor is supported by the seat at a right side and further comprising a second retractor supported by the seat at a left side, the webbing extending from the second retractor.

7. The assembly of claim 3, wherein the webbing is fixed to the airbag.

8. The assembly of claim 7, wherein the webbing is fixed to the airbag between the tether and the webbing retractor.

9. The assembly of claim 1, wherein the seat bottom includes a frame, the pyrotechnic retractor fixed to the frame.

10. The assembly of claim 1, wherein the pyrotechnic retractor is supported at the front end of the seat bottom.

11. The assembly of claim 1, wherein the pyrotechnic retractor is supported at a right side of the seat bottom and further comprising a second pyrotechnic retractor supported at a left side of the seat bottom and a second tether connected to the bottom end of the airbag and to the second pyrotechnic retractor.

12. The assembly of claim 1, wherein the seat includes a seatback, the airbag supported by the seatback.

13. The assembly of claim 12, wherein the airbag in the inflated position extends upward from the seatback and forward of the seat bottom.

14. The assembly of claim 13, wherein the airbag in the inflated position extends from a right side and a left side of the seatback.

15. The assembly of claim 14, wherein the airbag in the inflated position surrounds an occupant cavity.

16. The assembly of claim 15, wherein the seat includes a head restraint supported by the seat back, the head restraint disposed within the occupant cavity surrounded by the airbag in the inflated position.

17. The assembly of claim 1, wherein the airbag in the inflated position includes a first chamber and a second chamber.

18. The assembly of claim 17, wherein the first chamber is at a right side of the seat and the second chamber is at a left side of the seat.

* * * * *